United States Patent
Fujita

(10) Patent No.: US 8,048,578 B2
(45) Date of Patent: Nov. 1, 2011

(54) FUEL CELL SYSTEM AND VEHICLE MOUNTED WITH FUEL CELL SYSTEM

(75) Inventor: Nobuo Fujita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 697 days.

(21) Appl. No.: 12/087,313

(22) PCT Filed: Mar. 27, 2007

(86) PCT No.: PCT/JP2007/057338
§ 371 (c)(1),
(2), (4) Date: Jul. 1, 2008

(87) PCT Pub. No.: WO2007/122979
PCT Pub. Date: Nov. 1, 2007

(65) Prior Publication Data
US 2009/0004518 A1 Jan. 1, 2009

(30) Foreign Application Priority Data
Apr. 19, 2006 (JP) .................................. 2006-115268

(51) Int. Cl.
*H01M 8/04* (2006.01)
*B60L 11/18* (2006.01)

(52) U.S. Cl. ........ 429/428; 429/430; 429/433; 429/442; 903/908; 903/944

(58) Field of Classification Search .................. 429/428, 429/430, 433, 442; 903/908, 944; 700/286
See application file for complete search history.

(56) References Cited

U.S. PATENT DOCUMENTS

| | | | |
|---|---|---|---|
| 2003/0155160 A1 | 8/2003 | Nomura et al. | |
| 2004/0224191 A1 | 11/2004 | Skiba | |
| 2005/0255351 A1 | 11/2005 | Fukuda | |
| 2007/0141418 A1* | 6/2007 | Ota et al. | 429/24 |

FOREIGN PATENT DOCUMENTS

| | | | |
|---|---|---|---|
| JP | 2001351652 A | * | 12/2001 |
| JP | 2002184437 A | * | 6/2002 |
| JP | 2002-313388 A | | 10/2002 |
| JP | 2003-257441 A | | 9/2003 |
| JP | 2003-317787 A | | 11/2003 |
| JP | 2004-055378 A | | 2/2004 |
| JP | 2004-153947 A | | 5/2004 |
| JP | 2004-290000 A | | 10/2004 |
| JP | 2005-011779 A | | 1/2005 |
| JP | 2005-251576 A | | 9/2005 |
| JP | 2005-267961 A | | 9/2005 |
| JP | 2006-290033 A | | 10/2006 |
| WO | WO 2005088754 A1 | * | 9/2005 |

* cited by examiner

*Primary Examiner* — Gregg Cantelmo
(74) *Attorney, Agent, or Firm* — Kenyon & Kenyon LLP

(57) ABSTRACT

When a vehicle mounted with a fuel cell system travels using electric power supplied from the system, a predetermined portion forming the system, such as a fuel cell, is prevented from being frozen by the relative wind. The fuel cell system is mounted on a vehicle and has the fuel cell for generating electric power by using fuel gas and oxidized gas as fuel and also has a control section for controlling the system. When the speed of the vehicle is higher than or equal to a predetermined threshold and predetermined conditions determined by physical quantities relating to power generation conditions of the fuel cell are satisfied, the control section determines that freeze prevention processing is necessary even if the fuel cell is generating electric power and performs the processing.

14 Claims, 8 Drawing Sheets

FUEL CELL SYSTEM AND VEHICLE MOUNTED WITH FUEL CELL SYSTEM

This is a 371 national phase application of PCT/JP2007/057338 filed 27 Mar. 2007, claiming priority to Japanese Patent Application No. 2006-115268 filed 19 Apr. 2006, the contents of which are incorporated herein by reference.

TECHNICAL FIELD

The present invention relates to a fuel system including a fuel cell, and more particularly to control of a fuel cell at the time of starting.

BACKGROUND ART

Fuel cell systems, when left in a continuously halted state for a long time under low-temperature circumstances such as outdoors in cold climate areas, may suffer from freezing of water content within the systems. Accordingly, various methods have been conventionally proposed for preventing freezing of fuel cell systems.

JP 2005-267961 A discloses a technology concerning a fuel cell system for performing a so-called intermittent operation by switching between a power generation state and a halt state in accordance with electric power required by an electronic vehicle, a charged state of a secondary battery, and so on. In this system, when there is a possibility that the fuel cell will freeze, the intermittent operation is prohibited, thereby increasing the output power of the fuel cell to prevent freezing.

JP 2004-153947 A discloses a technology concerning a hybrid car equipped with a fuel cell system and an engine. According to this technology, when an outside temperature is lower than a predetermined reference temperature, power generation by the fuel cell is prohibited and desired electric power is obtained by the engine.

JP 2005-251576 A discloses a technology, in a fuel cell system, for performing a scavenging processing to remove water content within the fuel cell when there is a possibility that the fuel cell will freeze while the system is halted.

In this regard, when a vehicle in which a fuel cell system is mounted travels by using electric power generated by the fuel cell system in the low temperature circumstances, there is a possibility that the relative wind generated in association with running of the vehicle may cause freezing of a component forming the fuel cell system.

DISCLOSURE OF THE INVENTION

As described above, various methods for preventing freezing of a fuel cell system have conventionally been proposed. The fuel cell systems of the related art, however, take no consideration of the possibility that a component forming a fuel cell system which is mounted in a vehicle would freeze due to the relative wind when the vehicle travels using electric power supplied from the fuel cell system.

The present invention advantageously prevents a predetermined portion forming a fuel cell system, such as a fuel cell, which is mounted on a vehicle from being frozen by the relative wind when the vehicle travels by using electric power supplied from the fuel cell system.

In accordance with an aspect of the present invention, there is provided a fuel cell system mounted on a vehicle and including a fuel cell which generates electric power using fuel gas and oxidized gas as fuel, comprising freeze prevention processing means which performs freeze prevention processing, and control means which determines that the freeze prevention processing is necessary even if the fuel cell is generating electric power, when a speed of the vehicle is a predetermined threshold speed or higher and a predetermined condition which is determined based on a physical quantity concerning a power generation state of the fuel cell is satisfied, and controls the freeze prevention processing means to execute the freeze prevention processing.

In accordance with one aspect of the invention, the predetermined condition is a condition which is determined based on an outside air temperature and an output power of the fuel cell.

In accordance with another aspect of the invention, the predetermined condition is a condition which is determined based on an outside air temperature and a temperature of the fuel cell.

In accordance with still another aspect of the invention, the predetermined condition is a condition which is determined based on an outside air temperature and a temperature of a coolant for cooling the fuel cell.

In accordance with a further aspect of the invention, the predetermined condition is a condition which is determined based on an output power of the fuel cell and a fuel gas amount or an oxidized gas amount which is consumed at the time of generation of electric power by the fuel cell.

In accordance with a still further aspect of the invention, the predetermined condition is a condition which is determined based on a concentration of nitrogen within piping through which the fuel gas passes.

In accordance with another aspect of the invention, the freeze prevention processing means increases a passage resistance in piping through which the fuel gas or the oxidized gas passes to execute the freeze prevention processing.

In accordance with yet another aspect of the invention, the freeze prevention processing means increases the rotational speed of a pump which is provided in the piping for performing passage control of the fuel gas or the oxidized gas to increase the passage resistance in the piping.

In accordance with a further aspect of the invention, the freeze prevention processing means adjusts a closing/opening amount of a valve provided in piping near an outlet of a pump which performs passage control of the fuel gas or the oxidized gas to control an amount of fuel gas or oxidized gas to be discharged from the pump, thereby increasing the passage resistance within the piping.

In accordance with a still further aspect of the invention, the freeze prevention processing means limits an amount of fuel gas or oxidized gas to be supplied to the fuel cell to execute the freeze prevention processing.

In accordance with another aspect of the invention, the freeze prevention processing means increases electric power generated by the fuel cell to execute the freeze prevention processing.

In accordance with still another aspect of the invention, when the freeze prevention processing means is executing the freeze prevention processing, the control means outputs information indicating that the freeze prevention processing means is executing the freeze prevention processing.

In accordance with still another aspect of the invention, the control means, on receiving a system halt request while the freeze prevention processing means is executing the freeze prevention processing, outputs a predetermined warning.

In accordance with yet another aspect of the invention, a vehicle includes the fuel cell system according to claim 1 and a drive source which performs driving using electric power supplied from the fuel cell system.

According to the present invention, it is possible to suppress freezing of a predetermined portion forming a fuel cell system such as a fuel cell, caused by the relative wind generated when a vehicle in which the fuel cell system is mounted travels by using electric power supplied from the fuel cell system.

BRIEF DESCRIPTION OF THE DRAWINGS

These and other objects of the invention will be explained in the description below, in connection with the accompanying drawings, in which.

BEST MODE FOR CARRYING OUT THE INVENTION

A preferred embodiment of the present invention will be described with reference to the drawings.

Figure 1:
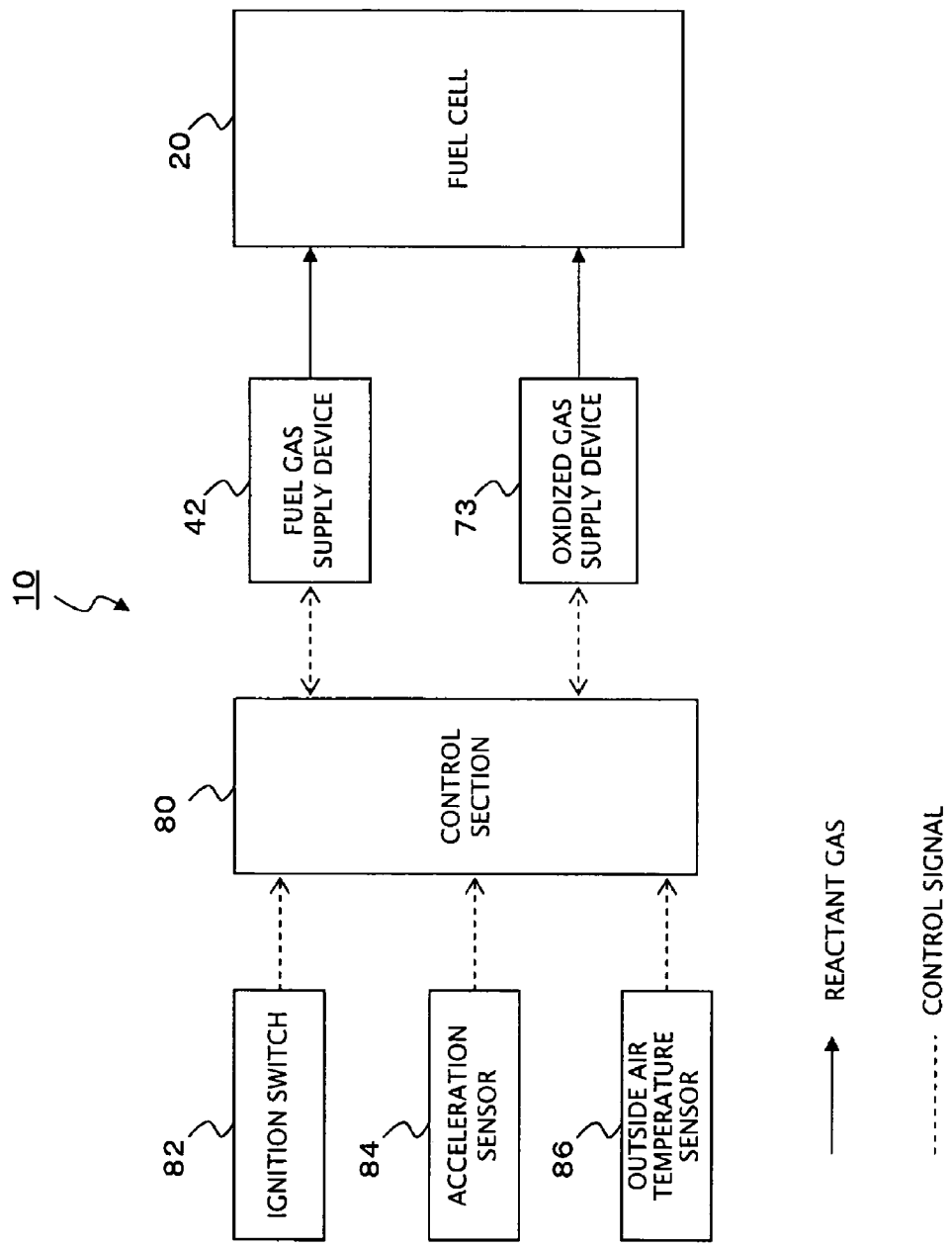
FIG. 1 is a view schematically showing a structure of a fuel cell system according to an embodiment of the present invention.

FIG. 1 schematically shows a structure of a fuel cell system according to an embodiment of the present invention. The fuel cell system of the present embodiment is to be mounted as a power source on a vehicle which is driven by a motor (an electric motor). The fuel cell system is actuated when a user turns on an ignition key, and generates power in accordance with an amount of accelerator operation performed by the user. The vehicle can then travel by using electric power supplied from the fuel cell system.

Referring to FIG. 1, the fuel cell system 10 mainly includes a fuel gas supply device 42, an oxidized gas supply device 73, a fuel cell 20, and a control section 80. The fuel gas is hydrogen gas, for example. The oxidized gas is air, for example. The control section 80 receives a system actuation signal and a system halt signal from a user, and controls actuation and halt of the system in accordance with these signals. The control section 80 further obtains an amount of required power of the fuel cell 20 from the accelerator opening detected by an accelerator sensor 84 and controls the fuel gas supply device 42 and the oxidized gas supply device 73 such that a desired amount of power can be obtained, thereby adjusting the flow rates of the fuel gas and the oxidized gas to be supplied to the fuel cell 20. Further, as will be described in detail below, the control section 80 utilizes information on the outside air temperature detected by an outside air temperature sensor 86 when executing the processing in the flowchart shown in FIG. 3.

Figure 2:
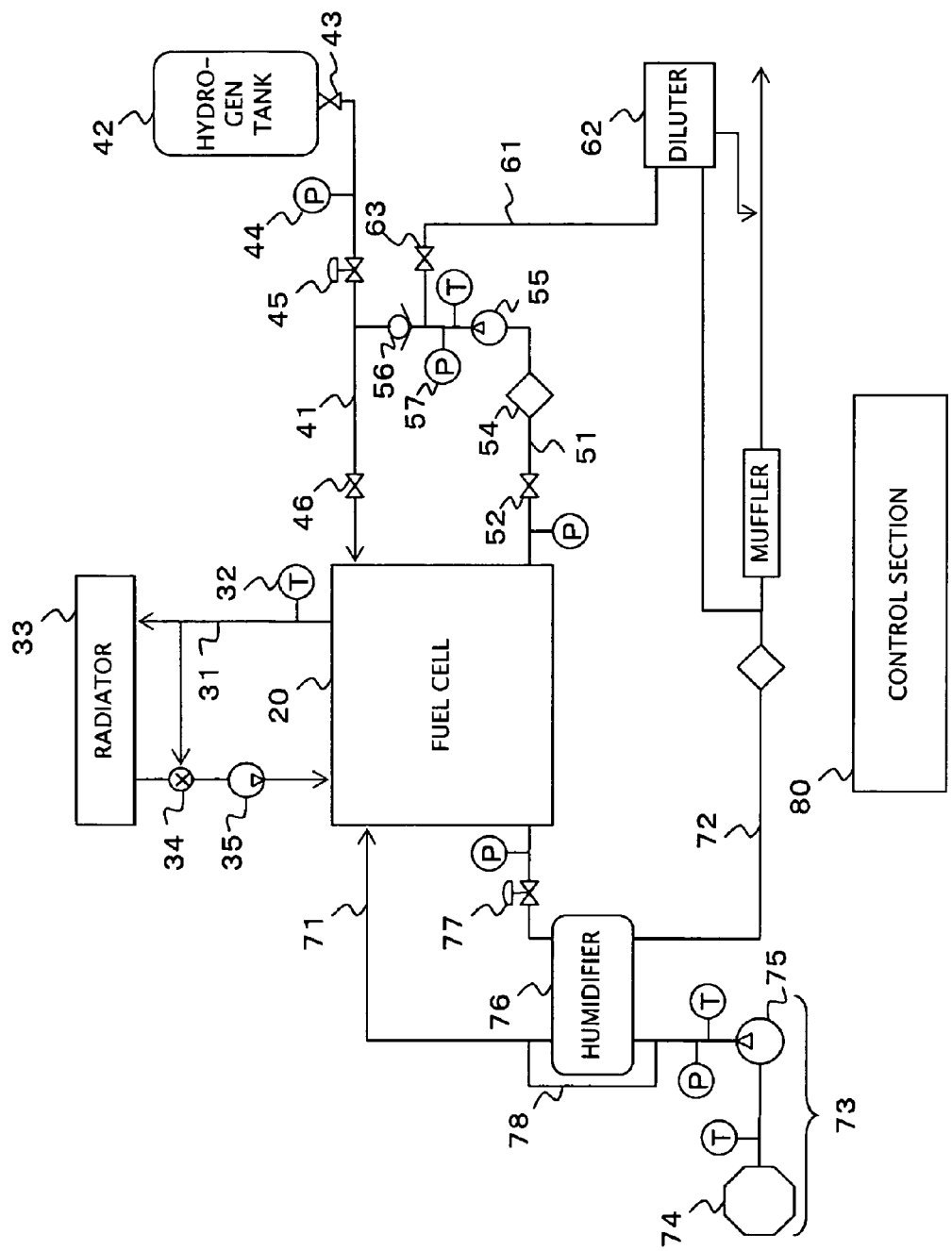
FIG. 2 is a view showing a structure mainly including a piping arrangement of the fuel cell system according to the embodiment of the invention.

FIG. 2 shows a system structure of the fuel cell system 10 in which piping is mainly shown. As shown in FIG. 2, the fuel cell system 10 includes a fuel gas supply line for supplying fuel gas to the fuel cell 20, an oxidized gas supply line for supplying oxidized gas to the fuel cell 20, and a coolant supply line for cooling or warming up the fuel cell 20 by a coolant.

The fuel cell 20 is formed of stacked cells which generate power through an electrochemical reaction between hydrogen, which is fuel gas, and oxygen, which is oxidized gas. Each cell is formed by arranging a hydrogen electrode (hereinafter referred to as an anode) and an oxygen electrode (hereinafter referred to as a cathode) with an electrolyte membrane being interposed therebetween. While in this embodiment a solid polymer cell, which includes a solid polymer membrane such as Nafion (registered mark) as an electrolyte membrane, will be described as an example, the present invention is not limited to this structure and is applicable to various types of cells.

The coolant supply line of the fuel cell system 10 includes a coolant passage 31 for circulating the coolant, a temperature sensor 32 for detecting the temperature of the coolant discharged from the fuel cell 20, a radiator 33 for externally dissipating heat from the coolant, a valve 34 for adjusting an amount of the coolant flowing into the radiator 33, and a pump 35 for pressurizing and circulating the coolant. When cooling the fuel cell 20, the valve 34 is used to increase the amount of coolant flowing into the radiator 33 under control of the control section 80, thereby supplying the coolant which is cooled by the radiator 33 to the fuel cell 20. When warming up the fuel cell 20, on the other hand, the valve 34 is used to reduce the amount of coolant flowing into the radiator 33 under control of the control section 80, to thereby supply the coolant, for which cooling by the radiator 33 has been suppressed, to the fuel cell 20.

A fuel gas passage 41 for supplying fuel gas to the anode, and a circulation passage 51 for circulating the fuel off-gas discharged from the anode to the fuel gas passage 41, are disposed in the fuel gas supply line of the fuel cell system 10.

A shutoff valve 43 which controls supply/interruption of the fuel gas from the fuel gas supply device 42, a pressure sensor 44 which detects the pressure of the fuel gas, a regulator 45 which performs pressure adjustment of the fuel gas, a shutoff valve 46 which opens/closes a fuel gas inlet port of the fuel cell 20, and so on, are provided in the fuel gas passage 41. The fuel gas supply device 42 is formed of a high pressure hydrogen tank, a hydrogen storing alloy, a reformer, and so on.

A shutoff valve 52 for discharging the fuel off-gas, a circulation pump 55 which is driven by a motor, and a backflow valve 56 which prevents backflow of the fuel gas in the fuel gas passage 41 toward the circulation passage 51 are provided in the circulation passage 51. The circulation pump 55, under control of the control section 80, compresses the fuel off-gas which has been subjected to pressure loss when passing through the anode to rise the pressure of the fuel off-gas to an appropriate gas pressure, and then circulates the gas through the fuel gas passage 41. The fuel off-gas then merges with fuel gas supplied from the fuel gas supply device 42 and is further supplied to the fuel cell 20 for future reuse.

The circulation passage 51 branches into a discharge passage 61 for discharging the fuel off-gas emitted from the fuel gas circulation line to the outside of the vehicle via a diluter (e.g. a hydrogen concentration reduction device) 62. A discharge valve 63 is provided in the discharge passage 61. With the opening and closing of the discharge valve 63, the fuel off-gas having an increased concentration of impurities due to repetitive circulation within the fuel cell 20 can be externally discharged, while new fuel gas can be introduced to thereby prevent a reduction in the voltage of the fuel cell. Further, with the opening and closing of the discharge valve 63, pulses are generated in the internal pressure of the circulation passage 51, so that water content accumulated in the gas passage can be removed. As such, with the opening and closing of the discharge valve 63, a scavenging processing in the fuel gas supply line can be achieved.

On the other hand, in the oxygen gas supply line of the fuel cell system 10, an oxygen gas passage 71 for supplying oxygen gas to the cathode and a cathode off-gas passage 72 for discharging the cathode off-gas emitted from the cathode are disposed. The oxygen gas passage 71 includes an oxygen gas supply device 73 formed of an air filter 74 which removes dust particles contained in the air taken in from the atmosphere and an air compressor 75 which is driven by a motor, for supplying compressed air to the oxygen gas passage 71 as oxygen gas. Further, a humidifier 76 disposed downstream of the oxygen gas supply device 73 performs exchange of water content between the cathode off-gas, which is in a highly-humid state due to water that has been generated by a cell reaction of the fuel cell 20, and the oxygen gas in a non-humid or dry state taken in from the atmosphere. The back pressure of the cathode is regulated to an approximately constant pressure by means of a pressure regulator valve 77 disposed in the cathode off-gas passage 72. The cathode off-gas flowing through the cathode off-gas passage 72 is discharged to the outside of the vehicle through a gas-liquid separator, a muffler, and so on, or a portion of the cathode off-gas flows into a diluter 62 where the cathode off-gas is mixed with the fuel off-gas accumulated therein to thereby dilute the fuel off-gas, which is then discharged outside the vehicle.

Also, a bypass passage 78 which bypasses the humidifier 76 is arranged in the oxygen gas passage 71. With dry air being supplied to the fuel cell 20 via the bypass passage 78, the water content remaining in the inner passage or the like in the fuel cell 20 can be removed. More specifically, by supplying dry air to the fuel cell 20 via the bypass passage 78, scavenging processing in the oxygen gas supply line can be achieved.

The control section 80 is configured as a microcomputer including a CPU, RAM, and ROM therein, and controls the operation of each section of the fuel cell system 10 in accordance with a program stored in the ROM. The control section 80, receiving a sensor signal from the temperature sensors T and the pressure sensors P disposed in each passage, drives each motor in accordance with a state of the cell operation (e.g. an electric power load) to adjust the rotational speed of the circulation pump 55 and the air compressor 75, and also controls opening/closing of the various valves or adjusts the opening amount of the valves.

According to the present embodiment, when a vehicle in which the fuel cell system 10 configured as described above is mounted travels using electric power supplied from the fuel system 10, freezing of a predetermined portion such as the fuel cell 20 due to the relative wind can suppressed.

Figure 3:
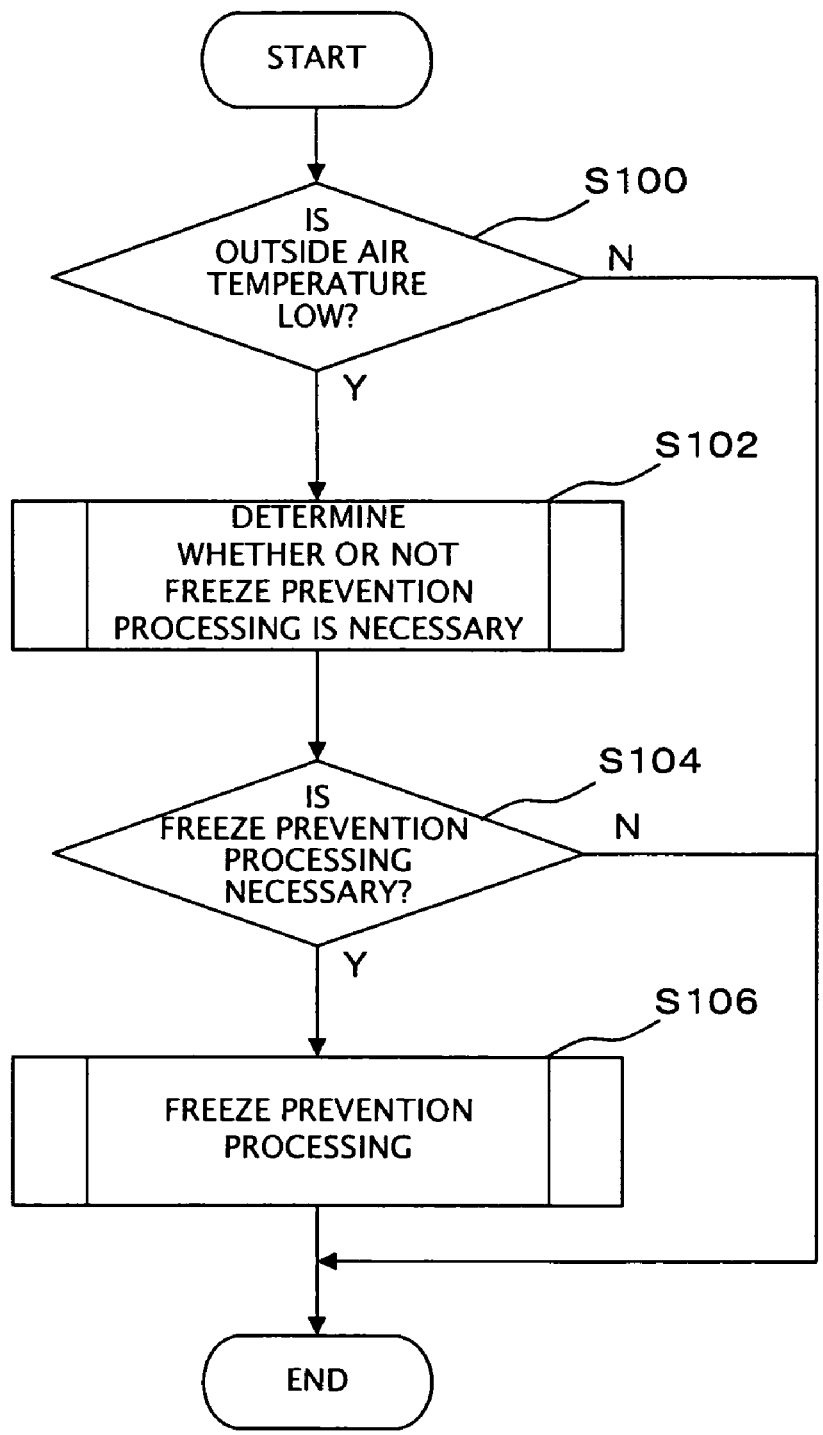
FIG. 3 is a flowchart showing a processing procedure which is performed by a control section for preventing freezing of a predetermined portion such as a fuel cell caused by the relative wind.

FIG. 3 is a flowchart illustrating a processing procedure which is executed by the control section 80 for preventing freezing of a predetermined portion such as the fuel cell 20 caused by the relative wind, according to the present embodiment. The control section 80 executes the processing procedure shown in FIG. 3 at predetermined intervals while the fuel cell 20 is generating power and the vehicle is traveling at a predetermined speed Vt (e.g. Vt>0) or a higher speed.

Referring to FIG. 3, the control section 80 determines whether or not the outside air temperature is low (S100). More specifically, the control section 80 determines whether or not the outside air temperature is equal to or lower than a predetermined threshold temperature (e.g. 2° C.), based on the outside air temperature information obtained from the outside temperature sensor 86 which detects the outside air temperature, and determines an outside air temperature which is equal to or lower than the predetermined threshold temperature to be a low temperature. If the outside air temperature is low (i.e. if the determination result in step S100 is affirmative "Y"), the control section 80 then determines whether or not the freeze prevention processing for a predetermined portion that forms the fuel cell system 10 is necessary (S102). The determination method in this step will be described in detail below. If it is determined that the freeze prevention processing is necessary as a result of determination in step S104 (i.e. if the determination result in step S104 is affirmative "Y"), the control section 80 executes the freeze prevention processing so as to prevent a predetermined portion that forms the fuel cell system 10 from being frozen (S106). A specific example of the freeze prevention processing will also be described in detail below. If the outside air temperature is higher than the predetermined threshold temperature, on the other hand (i.e. if the determination result in step S100 is negative "N"), the control section 80 does not execute the freeze prevention processing and processing terminates. Here, when the control section 80 executes the freeze prevention processing, a message indicating that the freeze prevention processing is being performed may be displayed on the dashboard, for example, or may be displayed on the screen for use in the navigation system.

Here, if a user turns off the ignition switch to thereby halt the fuel cell system 10 while the freeze prevention processing is being executed, there is a possibility that the predetermined portion will freeze after the halt of the system because the freeze prevention processing with respect to the predetermined portion is insufficient. In order to avoid such a situation, upon receiving a system halt request signal from a user via the ignition switch while the freeze prevention processing is being executed, a warning may be issued to inform the user that there is a possibility of the fuel cell system 10 freezing if the system is halted. Further, if freezing of the predetermined portion cannot be prevented even after the execution of the freeze prevention processing which will be detailed below, a warning may be issued to inform the user that there is a possibility of the fuel cell system 10 freezing and defects being caused if the vehicle continues to travel.

As described above, the control section 80 performs the freeze prevention processing as required while the fuel cell 20 is generating power and the vehicle is traveling at a predetermined threshold speed or a higher speed, so that freezing of a predetermined portion such as the fuel cell 20 caused by the relative wind can be suppressed. A portion of the system which generates heat in association with power generation, such as the fuel cell 20, located relatively apart from the heat source, is likely to be frozen by the relative wind under the low temperature circumstances. According to the present embodiment, however, freezing of the predetermined portion which is located distant from the heat source caused by the relative wind can be suppressed.

Here, a method of determining whether or not the freeze prevention processing is necessary will be described.

When a predetermined condition concerning the power generation state of the fuel cell is satisfied, the control section 80 determines that the freeze prevention processing is necessary, because it is likely that a predetermined portion that forms the fuel ell system 10 is frozen or will be frozen. A specific example of the predetermined condition concerning the power generation state of the fuel cell will now be described.

Figure 4:
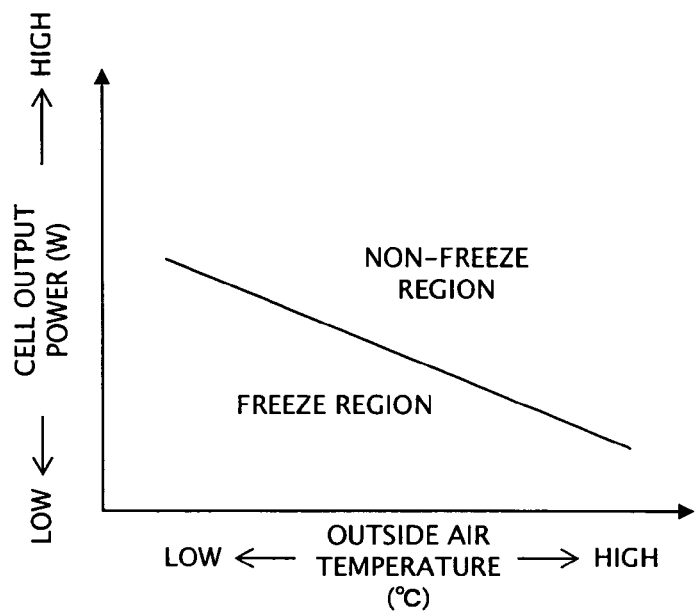
FIG. 4 is a view showing an example reference map using a cell output power and an outside air temperature as parameters, which the control section refers to when determining the need for freeze prevention processing.

For example, when the output power of the fuel cell 20 is lower than the reference output power which is expected in relation to the outside air temperature, there is a possibility that normal power generation of the fuel cell system 10 will not be performed due to freezing of the electrolyte membrane or the like within the fuel cell 20. Accordingly, the control section 80 refers to a reference map shown in FIG. 4, for example, to determine whether or not a position on the reference map which can be obtained using the cell output power and the outside air temperature as parameters is in a freeze region or a non-freeze region. Then, if a target position is included in the freeze region, the control section 80 can determine that the freeze prevention processing is necessary. Here, the cell output power can be obtained by using a voltage and an electric current which are measured by a voltage sensor and a current sensor provided in the fuel cell system 10 for measuring the voltage output from the fuel cell 20 and the electric current of the fuel cell 20, respectively.

Figure 5:
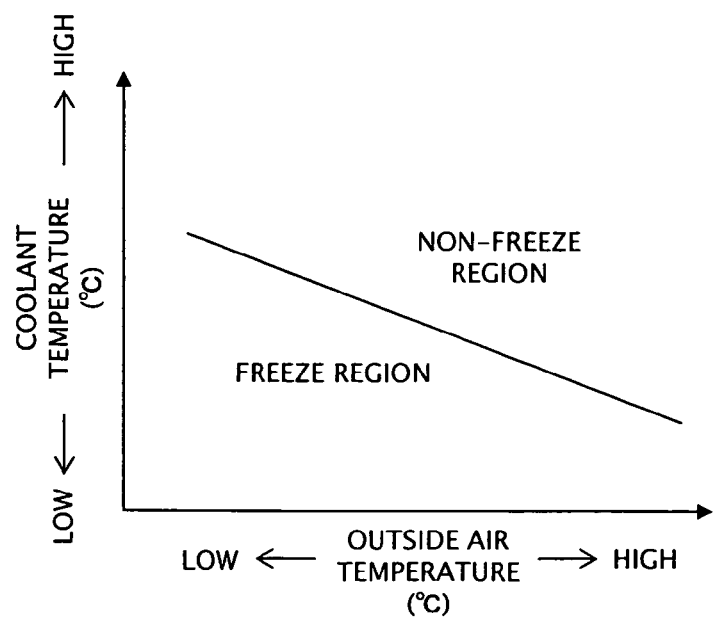
FIG. 5 is a view showing an example reference map using a coolant temperature and an outside air temperature as parameters, which the control section refers to when determining the need for freeze prevention processing.

Also, when the temperature of the coolant discharged from the fuel cell 20 is lower than a reference temperature which is expected in relation to the outside air temperature, there is a possibility that the fuel cell 20 or the like is frozen. Accordingly, the control section 80 refers to a reference map shown in FIG. 5, for example, to determine whether or not the freeze prevention processing is necessary in a manner similar to that described above.

Figure 6:
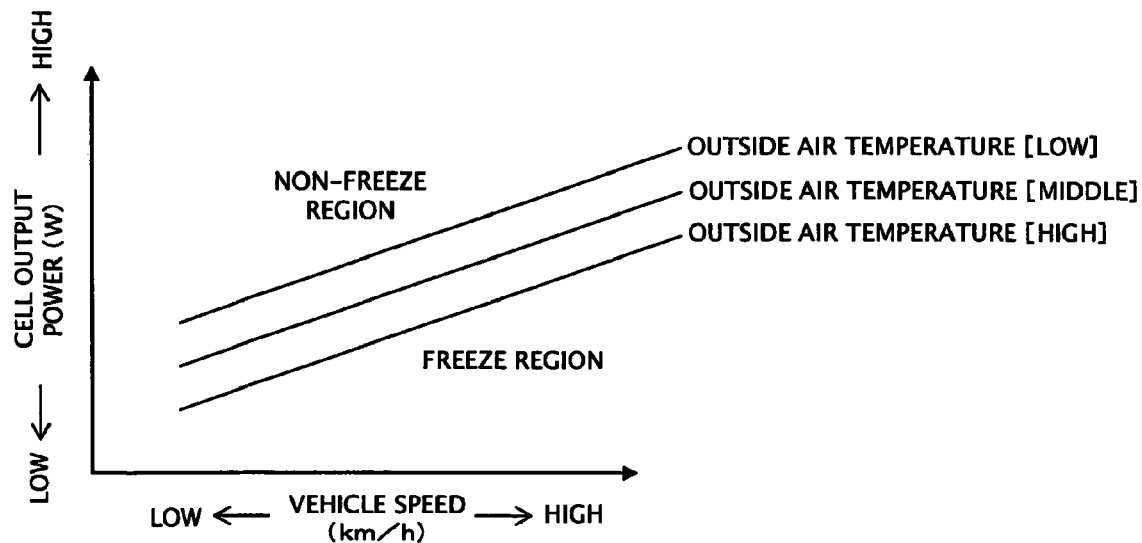
FIG. 6 is a view showing an example reference map using a cell output power, a vehicle speed, and an outside air temperature as parameters, which the control section refers to when determining the need for freeze prevention processing.

In addition, the higher the traveling speed of a vehicle, the greater the amount of the relative wind, resulting in a higher possibility of freezing. Further, the lower the outside air temperature, the higher the possibility of freezing due to the relative wind. Also, the output power of the fuel cell 20 in a frozen state is reduced compared to that in a non-frozen state. There is therefore a possibility that the fuel cell 20 or the like will be frozen if the output power of the fuel cell 20 is lower than a reference cell output power which is expected in relation to the vehicle speed and the outside air temperature. Accordingly, the control section 80 can refer to a reference map shown in FIG. 6 to determine whether or not the freeze prevention processing is necessary, based on a position on the reference map which can be obtained using the vehicle speed, the outside air temperature, and the cell output power as parameters.

Figure 7:
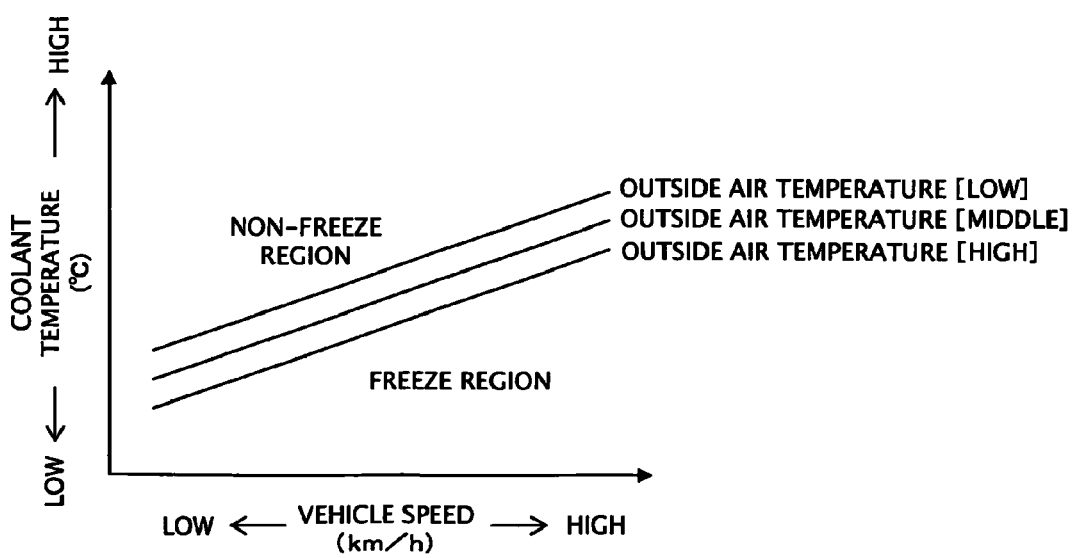
FIG. 7 is a view showing an example reference map using a coolant temperature, a vehicle speed, and an outside air temperature as parameters, which the control section refers to when determining the need for freeze prevention processing.

Further, as described above, when the temperature of the coolant is lower than the reference temperature which is expected in relation to the outside air temperature, there is a possibility that the fuel cell 20 of the like will be frozen, with the possibility of freezing increasing as the vehicle speed increases. Accordingly, the control section 80 can refer to a reference map as shown in FIG. 7 to determine whether or not the freeze preventing processing is necessary based on a position on the reference map which can be obtained using the vehicle speed, the outside air temperature, and the coolant temperature as parameters.

Also, when the internal pressure of air piping near the outlet port of the air compressor 75 is higher than an expected reference pressure, it is likely that a valve or the like disposed in the oxide gas supply line downstream of the air compressor 75 is frozen. Accordingly, when the air piping internal pressure is higher than the reference pressure, the control section 80 can determine that the freeze prevention processing is necessary.

Figure 8:
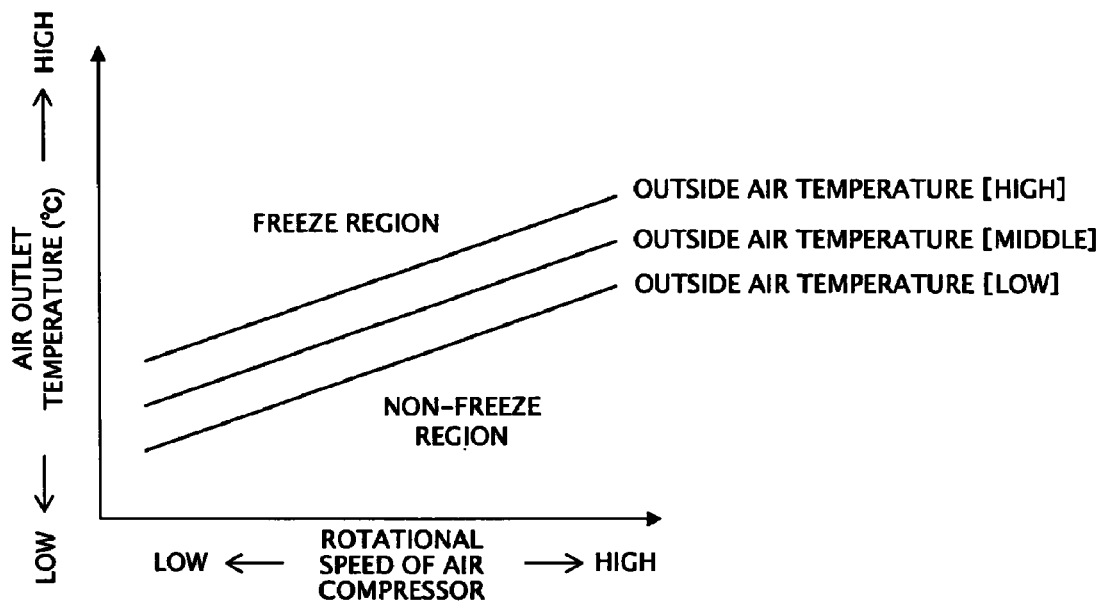
FIG. 8 is a view showing an example reference map using a temperature near the air outlet of an air compressor, the rotational speed of the air compressor, and an outside air temperature as parameters, which the control section refers to when determining the need for freeze prevention processing.

Further, there are cases where, due to an increase in the passage resistance within the piping caused by freezing of the values or the like, the air which is compressed by the air compressor 75 and has an increased temperature is difficult to discharge from the air compressor 75 and is therefore compressed once again, causing a further temperature rise in the compressed air. As such, when the temperature within the air piping near the outlet port of the air compressor 75 (hereinafter referred to as the air outlet temperature) is higher than a reference temperature which is expected in relation to the rotational speed of the air compressor 75 and the outside air temperature, there is a possibility that the value or the like is frozen as in the above example. Accordingly, the control section 80 can refer to a reference map as shown in FIG. 8 to determine whether or not the freeze prevention processing is necessary based on a position on the reference map which can be obtained using the air outlet temperature of the air compressor 75, the rotational speed of the air compressor 75, and the outside air temperature as parameters.

Figure 9:
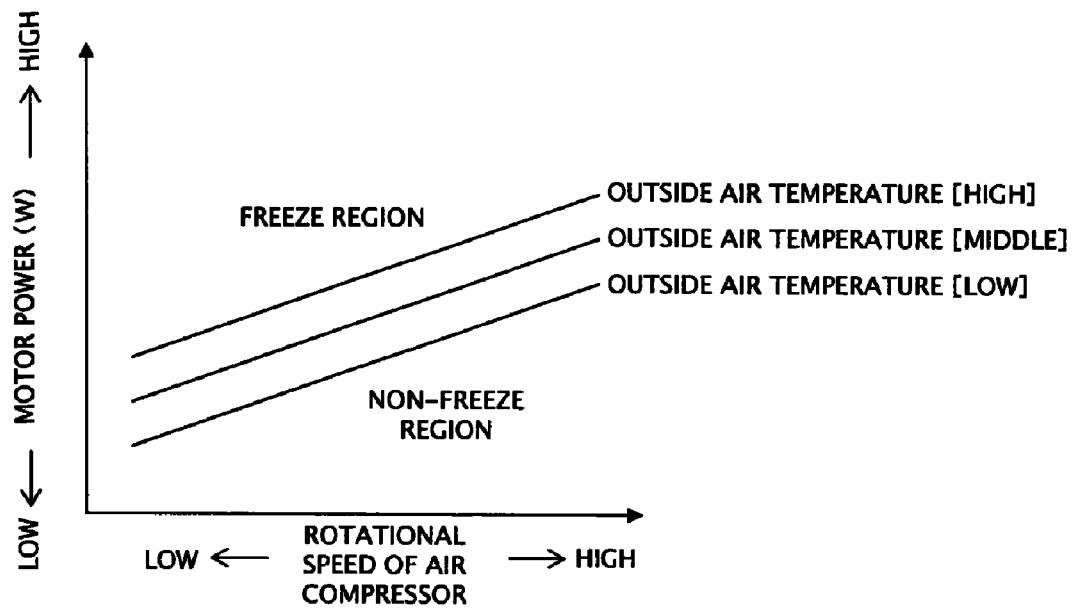
FIG. 9 is a view showing an example reference map using a motor power for driving the air compressor, the rotational speed of the air compressor, and an outside air temperature as parameters, which the control section refers to when determining the need for freeze prevention processing.

In addition, when it becomes difficult to discharge the air from the air compressor 75 due to freezing of the value or the like, the passage resistance within the piping increases, causing an increase in the output power of the drive motor which drives the air compressor 75. Accordingly, when the output power of the drive motor is higher than a reference output power which is expected in relation of the rotational speed of the air compressor 75, there is a possibility that the value or the like is frozen. Therefore, the control section 80 can refer to a reference map as shown in FIG. 9, to determine whether or not the freeze prevention processing is necessary based on a position on the reference map which can be obtained using the output power of the drive motor which drives the air compressor 75, the rotational speed of the air compressor 75, and the outside air temperature as parameters.

Figure 10:
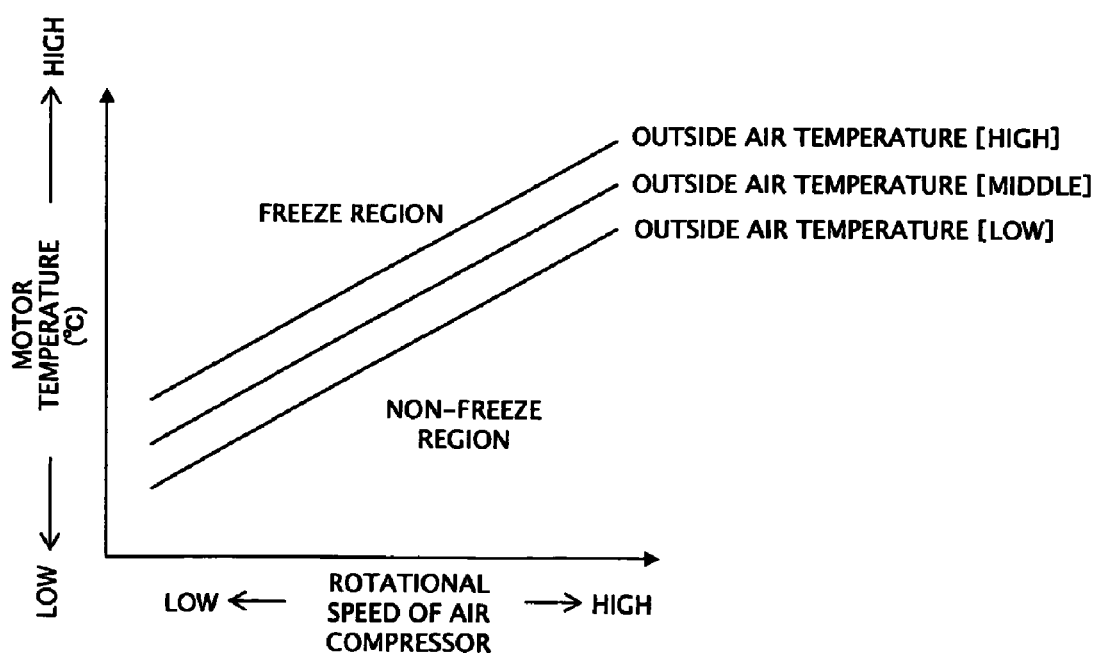
FIG. 10 is a view showing an example reference map using a temperature of the motor for driving the air compressor, the rotational speed of the air compressor, and an outside air temperature as parameters, which the control section refers to when determining the need for freeze prevention processing.

Similarly, with the increase in the output power of the drive motor which drives the air compressor 75 caused by freezing of the valve or the like, the temperature of the drive motor also increases compared to the temperature thereof in the normal state. Accordingly, the control section 80 can refer to a reference map as shown in FIG. 10 to determine whether or not the freeze prevention processing is necessary based on a position on the reference map which can be obtained using the temperature of the drive motor which drives the air compressor 75, the rotational speed of the air compressor 75, and the outside air temperature as parameters.

Figure 11:
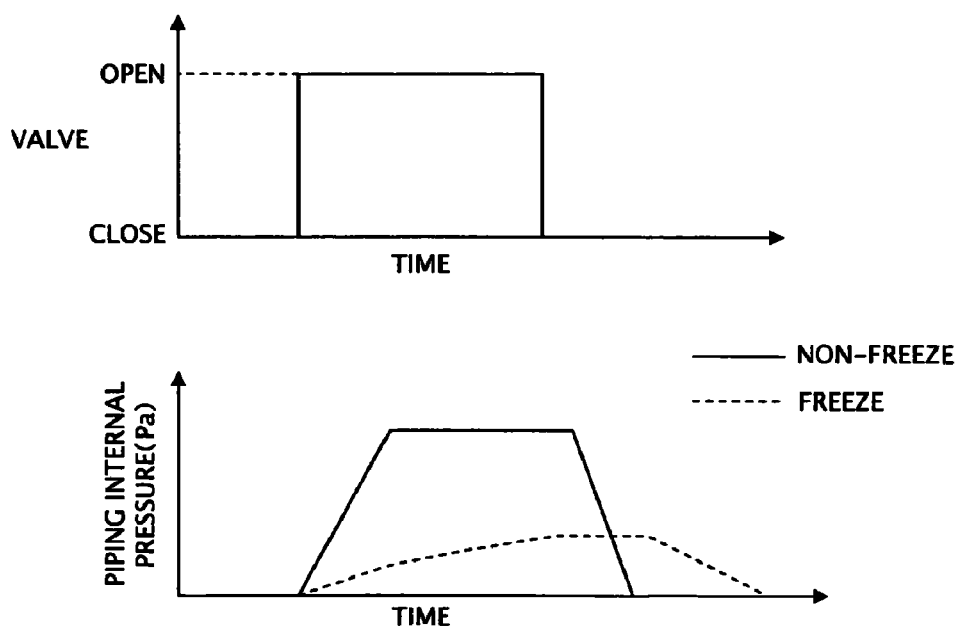
FIG. 11 is a view for explaining a decrease in pressure within the piping near the valve outlet port caused by freezing of the valve.

In addition, as shown in FIG. 11, there are cases wherein, when various valves disposed in each passage constituting the fuel cell system 10 are frozen, normal opening and closing operations of the valves cannot be performed, which prevents an increase in the piping internal pressure near the outlet port of the valves from reaching an expected reference pressure. Accordingly, the control section 80 may determine whether or not the piping internal pressure near the valve outlet port which increases with the opening and closing of the valve has reached the expected reference pressure and then determine that the freeze prevention processing is necessary if the piping internal pressure has not reached the reference pressure.

Moreover, there are cases wherein, when the valves disposed in the circulation passage 51 in the fuel gas supply line are frozen, the piping internal pressure (e.g. the pressure sensor P 57) in the circulation passage 51 is reduced. Accordingly, the control section 80 may determine that the freeze prevention processing is necessary when the piping internal pressure in the circulation passage 51 is lower than a predetermined reference pressure.

Further, there are cases where the concentration of nitrogen within the piping increases due to freezing of the valves disposed in the circulation passage 51 in the fuel gas supply line. Accordingly, the control section 80 may determine that the freeze prevention processing is necessary when the concentration of nitrogen within the piping is higher than a predetermined reference concentration. Here, the concentration of nitrogen within the piping can be estimated using a difference in pressure loss between hydrogen and nitrogen, for example. Specifically, because the pressure loss of nitrogen can be approximately 4 times as high as that of hydrogen, depending on a difference in density and viscosity, with the increase in concentration of nitrogen in the fuel gas within the fuel cell 20, the difference in pressure near the inlet port for supplying the fuel gas into the fuel cell 20 and the outlet port increases. Accordingly, the control section 80 can detect the difference between the pressure measured by the pressure sensor provided near the inlet port and the pressure measured by a pressure sensor provided near the outlet port to thereby estimate the concentration of nitrogen.

Figure 12:
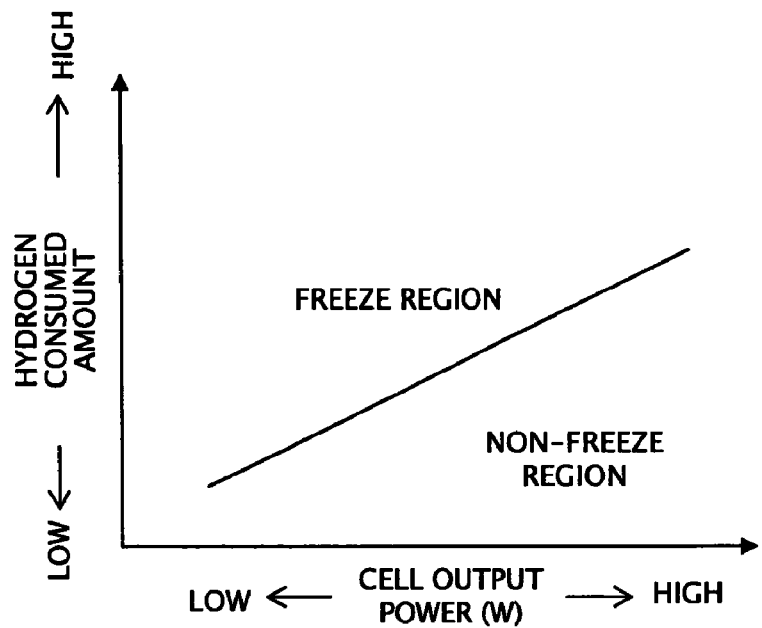
FIG. 12 is a view showing an example reference map using an amount of consumed hydrogen and a cell output power as parameters, which the control section refers to when determining the need for freeze prevention processing.

In addition, there are cases where when the valves disposed in the circulation passage 51, for example, in the fuel gas supply line are frozen, the amount of hydrogen which is consumed increases due to leakage of hydrogen from the frozen valves or the like. Accordingly, the control section 80 can refer to a reference map as shown in FIG. 12 to determine whether or not the freeze prevention processing is necessary based on a position on the reference map which can be obtained using the output power of the fuel cell 20 and the consumed amount of hydrogen as parameters. Here, when the valves disposed in the oxygen gas supply line are frozen, the amount of oxygen which is consumed may increase. Accordingly, the control section 80 may determine that the freeze prevention processing is necessary when the amount of consumed oxygen is greater than the reference amount of consumed oxygen which is expected in relation to the output power of the cell.

Figure 13:
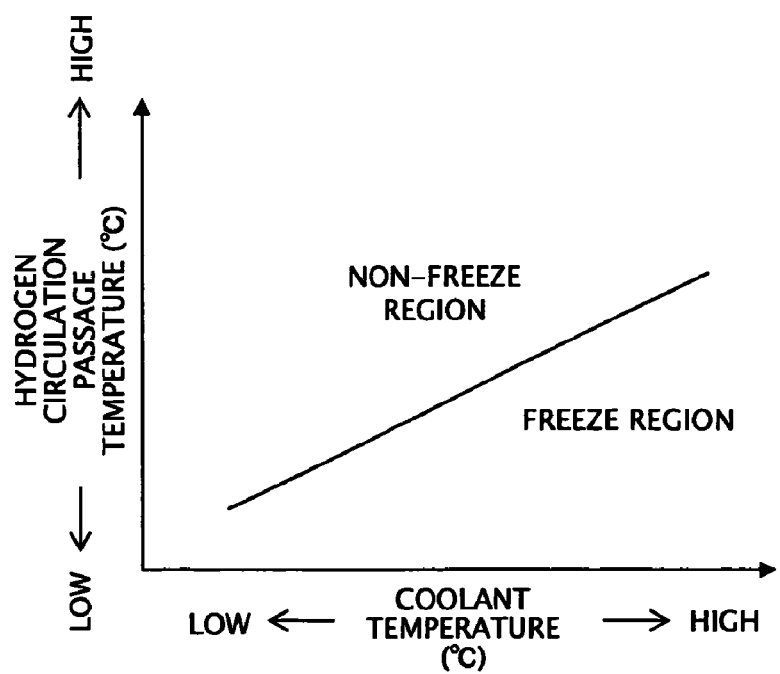
FIG. 13 is a view showing an example reference map using a temperature within the piping in the circulation passage and a coolant temperature as parameters, which the control section refers to when determining the need for freeze prevention processing.

Also, there are cases where, when the valves disposed in the circulation passage in the fuel gas supply line are frozen, the temperature within the piping in the circulation passage 51 becomes lower than a reference temperature which is expected in relation to the temperature of coolant discharged from the fuel cell 20. Accordingly, the control section 80 can refer to a reference map as shown in FIG. 13 to determine whether or not the freeze prevention processing is necessary based on a position on the reference map which can be obtained using the temperature of the coolant discharged from the fuel cell 20 and the temperature within the piping in the circulation passage 51 as parameters.

With the use of at least one of the determination methods described above, the control section 80 can determine whether or not the freeze prevention processing is necessary.

The freeze prevention processing will be now described.

The control section 80 operates the fuel cell 20 with low efficiency, for example, to thereby assist heat generation of the fuel cell 20 and thus suppress freezing of the fuel cell 20 or the like by using the generated heat. Here, the low-efficiency operation of the fuel cell 20 can be achieved by reducing the amount of oxygen supplied to the fuel cell 20 compared to the amount required during the normal operation, with respect to the required amount of power generated by the fuel cell 20.

Further, it is possible to provide a heater in the coolant passage 31 for circulating the coolant and to operate the heater by means of electric power generated by the fuel cell 20 to heat the coolant and then heat the fuel cell 20 by using the heated coolant, thereby suppressing freezing. As such, with the use of the heat generated in association with the increase in the output power of the fuel cell 20 and the heated coolant, freeze of the fuel cell 20 or the like can be suppressed.

Also, when it becomes difficult to discharge the air which is compressed by the air compressor 75 and has an increased temperature from the air compressor 75, the air is further compressed by the air compressor 75, thereby causing a further increase in the air temperature, as described above. In consideration of this fact, a butterfly valve which is driven by a motor, for example, is previously disposed near the air outlet port of the air compressor 75 and is used for freeze prevention. Specifically, with the closing of this valve, the passage resistance within the piping increases, making it difficult to discharge the air, which is compressed by the air compressor 75 and whose temperature is increased, from the air compressor 75, and this allows a further increase in the temperature of the air output from the air compressor 75. With this temperature rise in the air, freezing of the valves or the like disposed in the oxygen gas supply line can be reduced. As such, the control section 80 can achieve the freeze prevention processing by closing the butterfly valve provided near the air outlet port of the air compressor 75. Here, it is also possible to provide the butterfly valve as described above near the hydrogen outlet port of the circulation pump 55 and adjust closure of the valve, to thereby suppress freezing of the valves or the like disposed in the fuel gas supply line. The similar structure can be applied to the pump 35 for coolant.

Also, an increase in the passage resistance within the piping can be achieved by increasing the rotational speed of the pumps including the air compressor 75, the circulation pump 55, the pump 35 for coolant, and so on, compared to a rotational speed in a normal operation, similar to the case where the butterfly valve is closed as described above. Consequently, the control section 80 can suppress freezing of the valves or the like disposed in each line by increasing the rotational speed of the pumps.

As described above, according to the present embodiment, the control section 80, determining that the freeze prevention processing is necessary if the predetermined conditions concerning the power generation state of the fuel cell 20 as described above are satisfied while the fuel cell 20 is generating power and a vehicle is running at a predetermined threshold speed or faster, performs the freeze prevention processing as described above. Consequently, freezing of a predetermined portion, such as the fuel cell 20, caused by the relative wind can be suppressed.

The invention claimed is:

1. A fuel cell system mounted on a vehicle and including a fuel cell which generates electric power using fuel gas and oxidized gas as fuel, the fuel cell system comprising:
    a freeze prevention processing device which performs a freeze prevention processing; and
    a control device which determines that the freeze prevention processing is necessary even if the fuel cell is generating electric power, when a speed of the vehicle is a predetermined threshold speed or higher and a predetermined condition which is determined based on a physical quantity concerning a power generation state of the fuel cell is satisfied, and controls the freeze prevention processing device to execute the freeze prevention processing.

2. The fuel cell system according to claim 1, wherein the predetermined condition is a condition which is determined based on an outside air temperature and an output power of the fuel cell.

3. The fuel cell system according to claim 1, wherein the predetermined condition is a condition which is determined based on an outside air temperature and a temperature of the fuel cell.

4. The fuel cell system according to claim 1, wherein the predetermined condition is a condition which is determined based on an outside air temperature and a temperature of a coolant for cooling the fuel cell.

5. The fuel cell system according to claim 1, wherein the predetermined condition is a condition which is determined based on an output power of the fuel cell and a fuel gas amount or an oxidized gas amount which is consumed at the time of generation of electric power by the fuel cell.

6. The fuel cell system according to claim 1, wherein the predetermined condition is a condition which is determined based on a concentration of nitrogen within piping through which the fuel gas passes.

7. The fuel cell system according to claim 1, wherein the freeze prevention processing device is programmed to increase a passage resistance in piping through which the fuel gas or the oxidized gas passes to execute the freeze prevention processing.

8. The fuel cell system according to claim 7, wherein the freeze prevention processing device is programmed to increase the rotational speed of a pump which is provided in the piping for performing passage control of the fuel gas or the oxidized gas to increase the passage resistance in the piping.

9. The fuel cell system according to claim 7, wherein the freeze prevention processing device is programmed to adjust a closing/opening amount of a valve provided in piping near an outlet of a pump which performs passage control of the fuel gas or the oxidized gas to control an amount of fuel gas or oxidized gas to be discharged from the pump, thereby increasing the passage resistance within the piping.

10. The fuel cell system according to claim 1, wherein the freeze prevention processing device is programmed to limit an amount of fuel gas or oxidized gas to be supplied to the fuel cell to execute the freeze prevention processing.

11. The fuel cell system according to claim 1, wherein the freeze prevention processing device is programmed to increase electric power generated by the fuel cell to execute the freeze prevention processing.

12. The fuel cell system according to claim 1, wherein, when the freeze prevention processing device is executing the freeze prevention processing, the control device is programmed to output information indicating that the freeze prevention processing device is executing the freeze prevention processing.

13. The fuel cell system according to claim 1, wherein the control device, on receiving a system halt request while the freeze prevention processing device is executing the freeze prevention processing, is programmed to output a predetermined warning.

14. A vehicle including the fuel cell system according to claim 1 and a drive source which performs driving using electric power supplied from the fuel cell system.

* * * * *